United States Patent [19]

Pirsch

[11] Patent Number: 4,827,340
[45] Date of Patent: May 2, 1989

[54] VIDEO-SIGNAL DPCM CODER WITH ADAPTIVE PREDICTION

[75] Inventor: Peter Pirsch, Hanover, Fed. Rep. of Germany

[73] Assignee: Alcatel N.V., Amsterdam, Netherlands

[21] Appl. No.: 189,201

[22] Filed: May 2, 1988

[30] Foreign Application Priority Data

May 1, 1987 [DE] Fed. Rep. of Germany ....... 3714589

[51] Int. Cl.⁴ ............................................ H04N 7/137
[52] U.S. Cl. .................................... 358/136; 358/133; 375/27
[58] Field of Search ........................ 358/133, 135, 136; 375/27

[56] References Cited

U.S. PATENT DOCUMENTS

| | | | |
|---|---|---|---|
| 4,437,119 | 3/1984 | Matsumoto et al. | 358/136 |
| 4,546,386 | 10/1985 | Matsumoto | 358/136 |
| 4,591,908 | 5/1986 | Hirano | 358/136 |
| 4,607,281 | 8/1986 | Starck | 358/136 |
| 4,613,894 | 9/1986 | Catros | 358/136 |
| 4,679,086 | 7/1987 | May | 358/136 |
| 4,733,298 | 3/1988 | Koga | 358/133 |
| 4,743,967 | 5/1988 | Takenaka | 358/136 |

FOREIGN PATENT DOCUMENTS 3417139 11/1985 Fed. Rep. of Germany .

OTHER PUBLICATIONS

P. Pirsch, "Design of a DPCM Codec for VLSI Realization in CMOS Technology" *Proc. IEEE* vol. 73, No. 4, pp. 592–598 (Apr. 1985).

H. Buley et al, "Inter/Intraframe Coding of Color TV Signals for Transmission at the Third Level of the Digital Hierarchy" *Proc. IEEE* vol. 73, No. 4, pp. 765–77.

*Primary Examiner*—Howard W. Britton
*Attorney, Agent, or Firm*—Christie, Parker & Hale

[57] ABSTRACT

For a video-signal-coding facility using adaptive DPCM in which switching is effected block by block between different predictors, a basic circuit arrangement is given for the case where switching is to be effected between a two-dimensional intraframe predictor and a pure interframe predictor (FIG. 1). Uniform processor elements ($PE_1$, $PE_0$) cooperate with predictor loops ($Pr_1$, $Pr_2$, 10, 11) and circuits are provided which ensure that the appropriate reconstructed sample values ($X_0'$, $X_1'$) are used whenever switching between coders occurs. In a preferred embodiment (FIG. 3), the decision on the best suited coder is delayed by one block, whereby the maximum processing speed is substantially increased. Circuits ($PE_2$, 12, 13, $S_3'$, $S_4'$, $S_4'$) are provided which ensure that even in case of such a delayed decision, the correct reconstructed sample values ($x_0'$, $x_1'$, $x_2'$) are used.

6 Claims, 3 Drawing Sheets

VIDEO-SIGNAL DPCM CODER WITH ADAPTIVE PREDICTION

TECHNICAL FIELD

The present invention relates to a video-signal-coding system.

CLAIM FOR PRIORITY

This application is based on and claims priority from an application first filed in Federal Republic of Germany on May 1, 1987 under Ser. No. 37 14 589.4. To the extent such prior application may contain any additional information that might be of any assistance in the use and understanding of the invention claimed herein, it is hereby incorporated by reference.

BACKGROUND ART

Published German patent application No. DE-C2 32 22 648 (corresponding to U.S. Pat. No. 4,437,119 in the name of Matsumoto et al entitled "Inter-frame Adaptive Prediction System for Television Signals") and an article entitled "Inter/Intraframe Coding of Color TV Signals for Transmission at the Third Level of the Digital Hierarchy" by H. Buley et al (published in "Proceedings of the IEEE," Vol. 73, No. 4, April 1985, pp. 765–772) both disclose a video-signal-coding system concept wherein a sequence of digital video signal sample values is coded by adaptive DPCM. The disclosed systems each include two or more DPCM coders which process the sample values in parallel using differently operating predictors as well as a predictor controller which, after each block of successive sample values has been processed, decides which of the DPCM coders was best suited for this block, and them causes the sample values coded with the best suited DPCM coder to be transferred to the output. To make the prediction adaptive, switching is effected on a block by block basis between the different predictors (i.e., between the different coders). The above-cited prior art publications and patents do not disclose any switching of previously processed data to the respective predictor loop inputs of the individual coders which may be desirable in an adaptive coding system which switches between a coder with interframe prediction and a coder with two-dimensional intraframe prediction.

DISCLOSURE OF INVENTION

Accordingly, one object of the present invention is to provide a circuit configuration for an adaptive DPCM coding system in which switching is effected between a DPCM coder with interframe prediction and a DPCM coder with two-dimensional intraframe prediction.

It is a more specific object of a presently preferred embodiment to achieve the above object without any significant limitation on the speed of signal processing.

In accordance with other aspects of the invention, substantially identical DPCM processor elements each provide not only a coded output but also a second output that is a reconstructed (decoded) representation of the coded output. These processor elements are supplemented with novel switching means to ensure that the reconstructed data that is feed to each predictor loop (or at least those predictor loops that are used to generate the selected coded representation for a given block of signal samples) always corresponds exactly to the coded data that is actually output from the system. By including additional circuitry, including a second intraframe coder and additional switches and buffers, the selection of the best decoder may be delayed for one block, thereby avoiding constraints on processing speed.

BEST MODE FOR CARRYING OUT THE INVENTION

Figure 1:
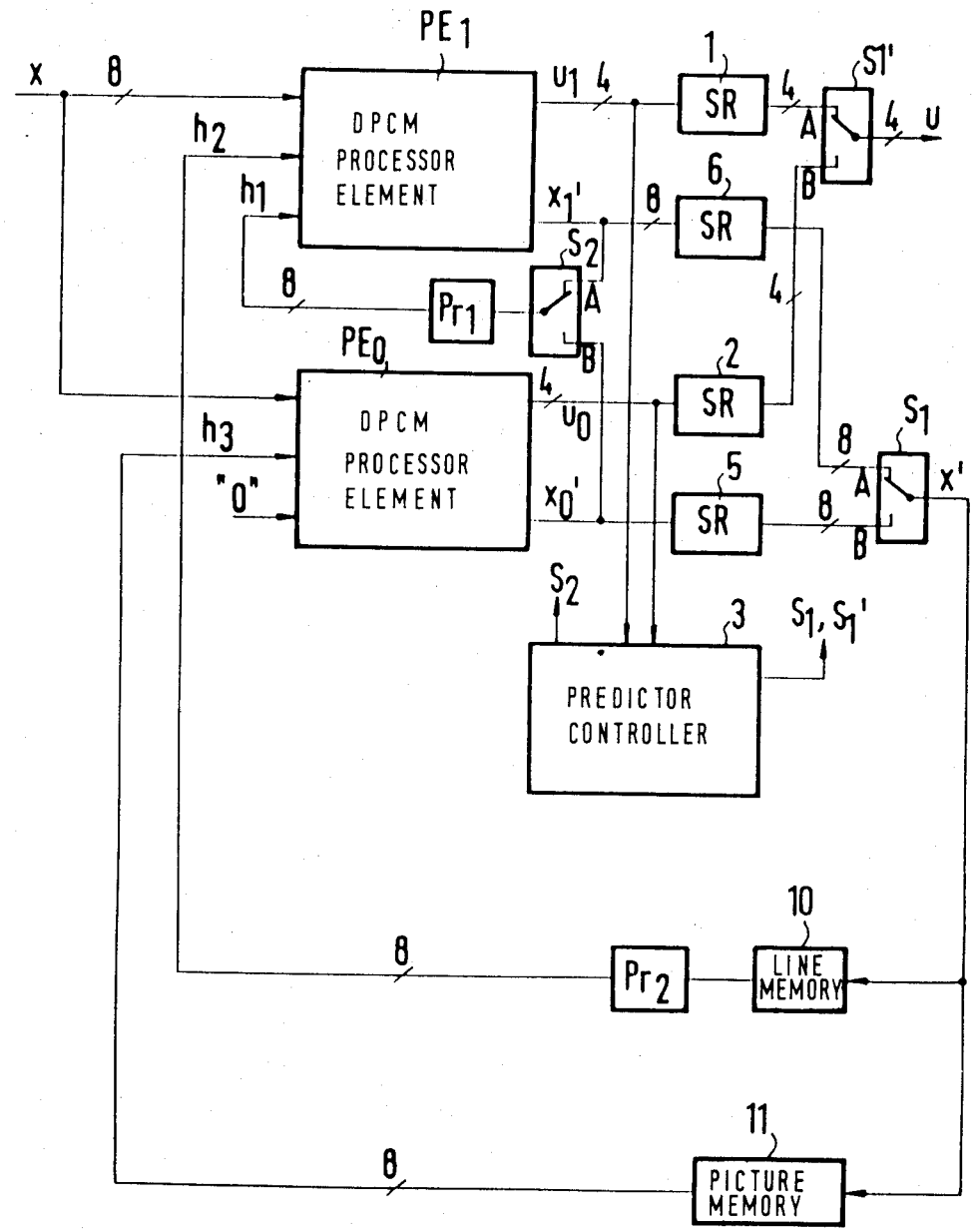
FIG. 1 shows the basic configuration of an adaptive DPCM coding system in accordance with the present invention.

In the system of FIG. 1, as in the above-mentioned prior art systems, sample values x of a video signal are entered into two parallel DPCM coders which include different predictors. (The preferred implementation of the coders will be explained later) Also as in the prior art, after the coding of each block of sample values, a decision is made as to whether the output values processed by one of the coders or those processed by the other coder will be processed.

Until this decision is made, the coded sample values appearing at the outputs of the two coders, $u_0$ and $u_1$, are temporarily stored in buffers (for example, an array of shift registers) 1 and 2 for the duration of one block. After a predictor controller 3 has determined the coder better suited for this block, it controls a selector switch $S_1'$ such that the latter selects either the sample values $u_0$ or the sample values $u_1$ as the coded sample values u to be transmitted, depending on which coder was determined to be better suited for this block by predictor controller 3.

The system described so far corresponds to the prior art coding system.

A first feature which distinguishes the present system from the above-mentioned prior art systems is that one of the DPCM coders contains an intraframe predictor with two-dimensional prediction, and the other an interframe predictor. As will be explained below, the former provides the coded sample values $u_1$, and the latter the coded sample values $u_0$.

Figure 2:
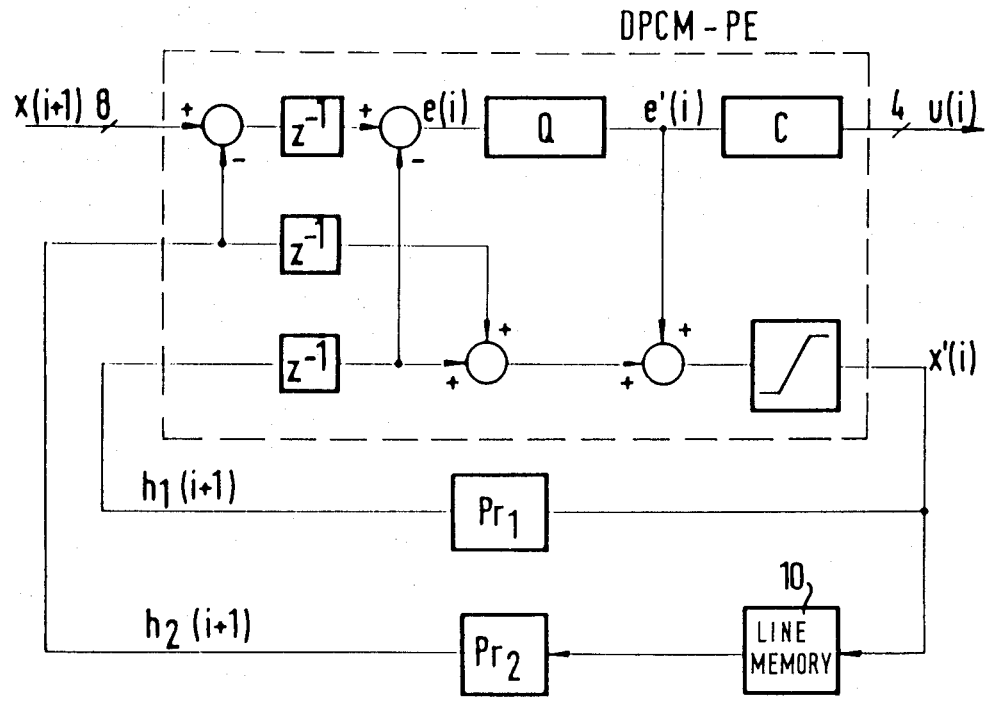
FIG. 2 illustrates an exemplary embodiment of the coding unit DPCM-PE$_i$ of FIGS. 1 and 3 using a prior art DPCM coder having a two-dimensional intraframe prediction capability.

In accordance with the presently preferred embodiment of my invention, the DPCM coder with the intraframe predictor is of a specific design, namely of the design disclosed in FIG. 2 of my Published German patent application No. DE-A1 34 17 139, and also in FIG. 4 of my article "Design of a DPCM Codec for VLSI Realization in CMOS Technology" published in *Proceedings of the IEEE*, Vol. 73, No. 4, April 1985, pp. 592–598.

The essential features of that particular DPCM coder, as far as they are relevant to the present invention, will now be explained with the aid of FIG. 2. The coder of FIG. 2 has two predictor loops, into which the reconstructed sample values x' are fed. The first predictor loop contains a predictor $Pr_1$, which calculates a first part $h_1(i+1)$ of the prediction value to be used for the sample value to be coded, $x(i+1)$, and the second predictor loop contains a line memory 10 and a predictor $Pr_2$, which calculates a second part $h_2(i+1)$ of the prediction value to be used for coding a sample value $x(i+1)$. To calculate the part $h_1(i+1)$, the predictor $Pr_1$ of the first predictor loop uses the reconstructed sample value $x'(i)$ of the previously coded sample value $x(i)$. To calculate its part $h_2(i+1)$, the second predictor loop uses the reconstructed sample values of the previously coded line. This loop therefore contains a line memory 10, which delays the reconstructed sample values $x'$ by one line, so that for the coding of a sample value $x(i+1)$, those reconstructed sample values from the preceding line are available to the predictor $Pr_2$ and are processed by the latter in accordance with its particular prediction algorithm to derive the corresponding value of the function $h_2(i+1)$.

The remaining portion of the coder of FIG. 2, which may be called a "DPCM processor element," is bounded by a broken line of FIG. 2 and designated DPCM-PE. It processes the two parts $h_2$ and $h_1$ separately and, thus, has separate parallel inputs for each of the two parts. The internal workings of DPCM-PE are not essential to an understanding of the present invention, and therefore, need not be explained here, the less so since exactly the same representation as in the above-cited publications was chosen. What is important is that for each uncoded input sample $x(i)$, the coded sample value $u(i)$ appears at a first output and the reconstructed sample value $x'(i)$ corresponding to that coded sample value $u(i)$ appears at a second output.

Using the individual circuit designations introduced in FIG. 2, the arrangement of FIG. 1 can be further described as follows. The two DPCM coders contain two DPCM processor elements $PE_1$ and $PE_0$ each of exactly the same design corresponding to the processing element DPCM-PE of FIG. 2. Associated with the processor element $PE_1$ is a first predictor loop with the predictor $Pr_1$, which provides the part $h_1$ of the prediction value as described with the aid of FIG. 2, and a second predictor loop with the line memory 10 and the predictor $Pr_2$, which provides the part $h_2$ of the prediction value. Processing element $PE_1$ and the two predictor loops associated with it thus form a DPCM coder employing two-dimensional intraframe prediction.

The other DPCM coder, which implements a conventional interframe coding algorithm, has a predictor loop containing a picture memory 11, whose output provides a prediction value $h_3$, which was derived from the corresponding element of the preceding picture frame and which serves as the first input of the DPCM processor element $PE_0$. (The second input of this element remains unwired, as is indicated by the "0" signal.)

The sample values reconstructed by the two processor elements $DPCM-PE_0$ and $DPCM-PE_1$, $x_0'$ and $x_1'$, are temporarily stored in buffers 5 and 6 in the same manner as were the coded sample values $u_0$ and $u_1$, and at the end of a block of sample values, a selector switch $S_1$ transfers the appropriate reconstructed (decoded) sample value (either $x_0'$ or $x_1'$) as reconstructed sample values $x'$ both into the line memory 10 of the second predictor loop of the intraframe processing element $PE_1$ and into the picture memory 11 of the predictor loop of the interframe coder. Which decoded output is selected (either $x_0'$ or $x_1'$) for feeding into the two predictor loops depends on which of the coders was found to be better suited for the block then being output and switch $S_1$ is thus controlled by the predictor controller 3 in exactly the same manner as is switch $S_1'$.

If after the last sample value in a block of sample values has been processed by both processor elements, it is decided that the interframe coder $DPCM-PE_2$ was better suited for this block, the predictor controller 3 sets an additional selector switch $S_2$ to switch position B while the first sample value of the following block is being processed. Normally, this switch $S_2$ is in switch position A, so that the sample values $x_1'$ reconstructed by intraframe processor element $DPCM-PE_1$ are fed into the first predictor loop of the intraframe coder; however, in position B, the reconstructed sample value $x_0'$ appearing at the output of interframe coder $DPCM-PE_0$ is fed into the predictor loop of the intraframe coder processing element $DPCM-PE_1$ instead of the reconstructed value $x_1'$ appearing at the output of the intraframe coder $DPCM-PE_1$. Prior to transmission, a conventional encoder (not shown) further encodes the coded sample values $u$, which are fixed-length-coded in $DPCM-PE_1$ or $DPCM-PE_0$, into compressed code words of variable length. Switch $S_2$ ensures that, for deriving $h_1$ during the coding of the first sample value of each succeeding block, the predictor loop for the intraframe DPCM coder actually uses the same reconstructed sample value as is actually encoded and transmitted to the receiver. To determine the more favorable coder, the coded sample values $u_1$ and $u_0$ are entered in parallel into predictor controller 3. Predictor controller 3 may then determine for each sample value of a block the number of bits necessary for the conversion into variable-length code words and to that end it includes an accumulator which accumulates the code-word lengths over a block separately for each of the coders, and a comparator which compares the results at the end of a block and thus decides in favor of one coder or the other. Obviously, other methods can be used for determining the more favorable coder.

The particular coding system that has just been described requires that selection between the two coders be made during the interval from the last sample value of a block to the first sample value of the next block, i.e., within only a single sample period. This limits the maximum operating speed of the coding system of FIG. 1.

Figure 3:
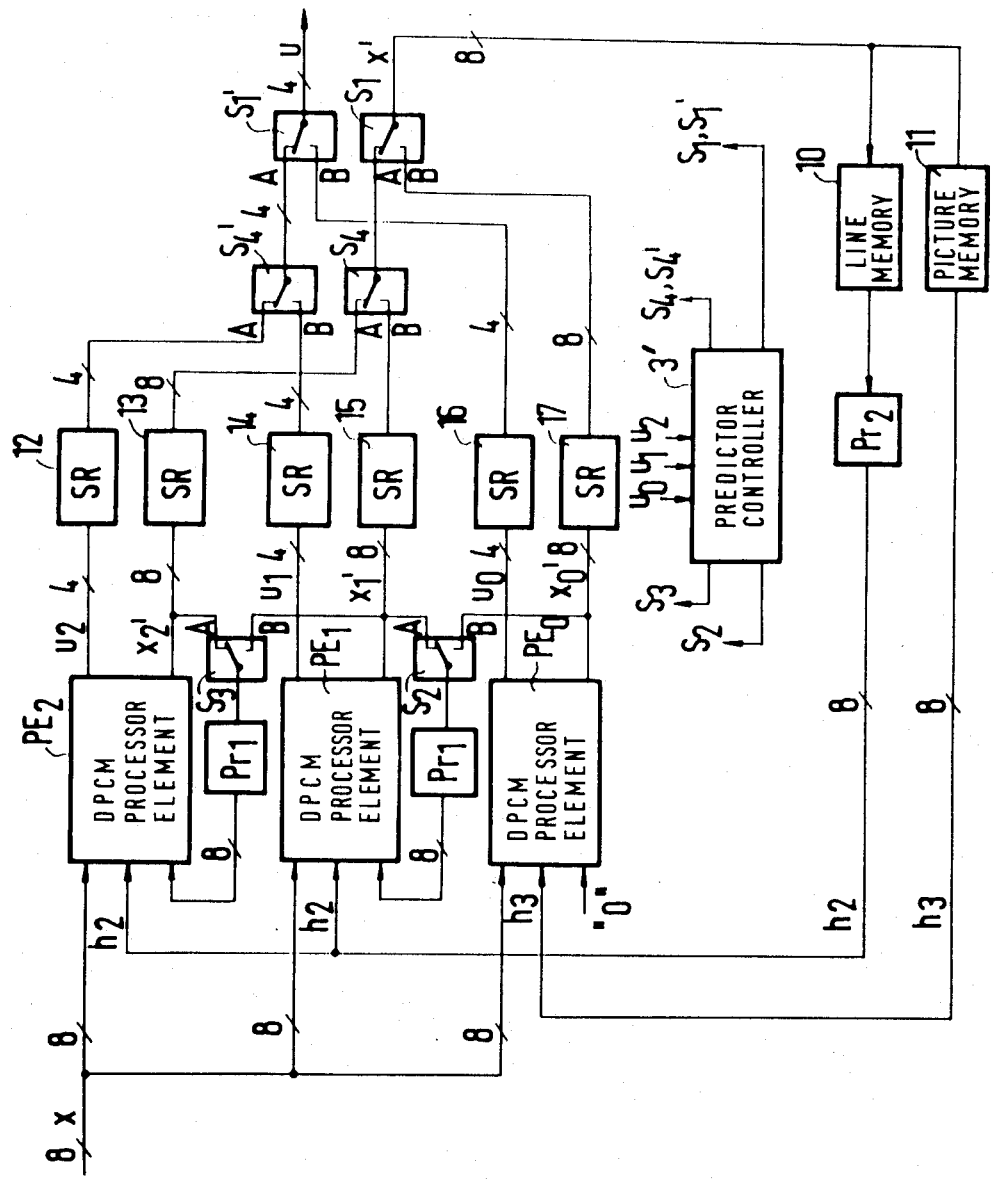
FIG. 3 shows an enhanced configuration of the FIG. 1 system providing faster signal processing.

FIG. 3 shows a preferred embodiment of the system according to the invention which is generally similar to that shown in FIG. 1, but which avoids this restriction and thus permits a substantially higher operating speed. Unlike the corresponding predictor controller 3 of FIG. 1, the predictor controller 3' of FIG. 3 does not decide on the DPCM coder suitable for coding a block until the end of the next block. Thus, for example, if a block has a length of 9 sample values, 9 sampling periods are available for determining the more favorable coder and for controlling the switches on the basis of this determination. Accordingly, the buffers following the outputs of the processor elements in the FIG. 3 embodiment (unlike buffers 1, 2, 5, 6 of the FIG. 1 embodiment) must provide a delay of two block lengths.

While the nth block is being coded and the output values of the processor elements are being entered into the buffers, the code-word lengths are accumulated for each of the coders as described above for the FIG. 1 embodiment. After the coding of the nth block, a similar coding operation takes place on the (n+1)st block, and while this block is being coded, a decision is made as to which of the coders was better suited for the nth block. At the end of the coding of the (n+1)st block, the coded sample values and the reconstructed (decoded) sample values from the selected coder (intraframe or interframe) are, in accordance with that decision, respectively switched to the appropriate output and feed back into the appropriate predictor loops as described above.

The delayed decision in the system of FIG. 3 necessitates a greater amount of circuitry to ensure that even if switching takes place with a delay greater than one sample period, those reconstructed sample values will be used for further processing which correspond to the particular selected coded sample values which are actually output from the system, because only the latter are available to the receiver.

The system of FIG. 3 has the same basic configuration as the system of FIG. 1; the additional circuitry required on account of the additional delaying in selected the more suitable decoder will now be described.

Like the system of FIG. 1, the system of FIG. 3 includes a DPCM coder with interframe prediction, consisting of the processor element $PE_0$ and the predictor loop with the picture memory 11, and a DPCM coder with two-dimensional intraframe prediction, consisting of the processor element $PE_1$ and the two predictor loops, the first with the predictor $Pr_1$ and the second with the predictor $Pr_2$ and the line memory 10.

In addition to those two DPCM coders, a second intraframe DPCM coder with two-dimensional intraframe prediction is provided. It consists of a second intraframe processor element $PE_2$, having a first predictor loop containing a predictor $Pr_1$ (which normally leads from an output of $PE_2$ that provides reconstructed sample values $x_2'$) to one of the inputs of $PE_2$. The second predictor loop associated with second intraframe processor element $PE_2$ includes the previously-mentioned predictor $Pr_2$ and line memory 10 which second intraframe processor element $PE_2$ shares with first intraframe processor element $PE_1$. All three processor elements $PE_0$, $PE_1$ and $PE_2$ are identical in design, and so are the predictors $Pr_1$ in the first predictor loops of $PE_1$ and $PE_2$. These first predictor loops contain switches $S_2$ and $S_3$, whose function will be explained later.

The outputs of the processor elements are followed by buffers 12 to 17, into which the coded sample values $u_2$, $u_1$, $u_0$ and the reconstructed sample values $x'$, $x_1'$, $x_0'$ from the three coders operating in parallel are entered. These buffers function as buffers to delay these sample values by two block lengths, for the reason explained above. Like in FIG. 1, selector switches $S_1'$ and $S_1$ are provided at the outputs of the coding system which, according to the decision made (switch position A or B), transfer either the coded sample values and the reconstructed sample values from the DPCM coders with intraframe prediction or the corresponding values of the DPCM coder with interframe prediction to the output and to the appropriate predictor loops. It will be noted that an additional selector switch $S_4'$ selectively connects one of the intraframe buffers 12, 14 to the intraframe input of the switch $S_1'$, and an additional selector switch $S_4$ which selectively connects one of the intraframe buffers 13, 15 to the intraframe input of the selector switch $S_1$. These two selector switches $S_4$ and $S_4'$ are also responsive to a control signal from predictor controller 3 and preselect the respective coded and decoded outputs from the proper one of the two-dimensional intraframe coders $PE_1$ and $PE_2$ in the event coding using two-dimensional intraframe prediction was found to be better suited for a block, as will become more clear hereinafter.

The function of the switches $S_2$ and $S_3$ is to ensure that even if switching is effected between the three coders at the beginning of a succeeding block, the part $h_1$ of the prediction value, which is derived from the reconstructed sample value of the immediately prior coded sample value, will be derived in at least one of the two intraframe coders from the "correct" reconstructed sample value, i.e., from the sample value which actually corresponds to the selected coded sample value. The function of the switches $S_4'$ and $S_4$ is to ensure that in the event that the two intraframe coders had used different values for first prediction part $h_1$ for the first sample value in a given block, the coder that was later determined to be using the "correct" first prediction part is preselected to provide the intraframe outputs to the other circuits in the system.

To this end, the first switch $S_2$ is so controlled by the predictor controller as to assume the switch position B instead of the normal position A for the duration of the first sample value of each block. Thus, at the beginning of each block, the prediction is based on the reconstructed value $x_0'$ instead of the value $x_1'$ normally used in the predictor $Pr_1$. This is done regularly and independently of any decision made in the predictor controller. Accordingly, the first intraframe processing element $PE_1$ will produce a correct intraframe output (delayed by two blocks via buffers 14, 15) at position B of switches $S_4'$, $S_4$ if and only if the previous block was coded using interframe coder processing element $PE_0$.

By contrast, the switch $S_3$ is so controlled by the predictor controller as to change from its normal position A to position B during the first sample value of each block only under a particular condition which will now be described. During the first sample value of the nth block, the switch $S_3$ remains in its normal position A if it was decided that coding with intraframe prediction was better suited for the (n−2)nd block. The switch $S_3$ changes to position B for the duration of this first sample value of the nth block if it was decided that coding with the interframe predictor was better suited for the (n−2)nd block. This decision as to which coding was better suited for the (n−2)nd block is made at the end of the (n−1)st block at the latest. Accordingly, second intraframe processing element $PE_2$ will produce the correct output if the previous block was also coded using interframe coding. It follows that if coding with interframe prediction is determined to be best suited for the current block, the nth block, one of the two intraframe predictor elements $PE_1$ and $PE_2$ will have the correct values for $x'$, namely either $PE^21$ with the value $x_0$ or $PE_2$ with the value $x_1'$.

The following example is to illustrate the operation of the different switches in greater detail. Upon turn-on of the coding system, only coding with intraframe prediction is practical, because no preceding picture is available yet. The switches $S_1$, $S_1'$, $S_4$, $S_4'$ and the switch $S_3$ thus remain in position A for the time being; only the switch $S_2$ goes to position B for the duration of the first sample value of each block. Assume that at the end of an nth block, the predictor controller decides that coding with interframe prediction was better suited for the (n−1)st block. This decision initiates the following switching operations:

For the duration of the coding of the (n+1)st block, the switches $S_1'$ and $S_1$ go to position B, so that during the coding of the (n+1)st block, the sample values $u_0$ produced by interframe processing element $PE_0$ and the reconstructed sample values $x_0'$ are transferred as values u and $x'$ for the (n−1)st block from the interframe buffers 16 and 17 to the output and into the appropriate predictor loops, respectively.

It will now be clear that the outputs from second intraframe coder $PE_2$ are not correct for the nth block, because only the first intraframe coder $PE_1$ used the correct value $x_0'$ (from intraframe coder $PE_0$ via position B of switch $S_2$) at the beginning of the block. Consequently, during the coding of the (n+1)st block, the predictor controller 3' needs to compare the result from interframe coder $PE_0$ only with that from the first intraframe coder $PE_1$.

For the duration of the coding of the first sample value of the (n+1)st block, the switch $S_3$ goes to position B, because, as stated above, it is now clear that it was not $PE_2$ which was suited for the nth block, but $PE_1$ (if coding with intraframe prediction proves to be more favorable at all).

If at the end of the (n+1)st block it is decided that the intraframe processor element $PE_1$ was better suited for the nth block than the interframe processor element $PE_0$, the switches $S_1'$ and $S_1$ will return to position A for the duration of the (n+2)nd block, so that the values $u_1$ and $x_1'$ produced by $PE_1$ for the nth block will be transferred to the output and into the appropriate predictor loops, respectively. At the same time, the switches $S_4'$ and $S_4$ will both be set to position B.

If, by contrast, it were decided at the end of the (n+1)st block that of the two processor elements $PE_1$ and $PE_0$ suitable for the nth block, the interframe processor element $PE_0$ is better suited, the switches $S_1'$ and $S_1$ would remain in position B for the duration of the coding of the (n+2)nd block (the positions of the switches $S_4'$ and $S_4$ would thus again be irrelevant), so that for this nth block, the values $u_0$ and $x_0'$ from $PE_0$ would be transferred to the output and into the appropriate predictor loops, respectively.

Only in the latter of these two cases (intraframe coding selected as better suited for two blocks in succession) would the switch $S_3$ go from its normal position A to position B during the first sample value of the (n+2)nd block.

The two switches $S_4'$, $S_4$ used to preselect the "correct" intraframe coder may thus be switched from to position B whenever a block is being output that immediately follows a block of intraframe coded output—i.e., the position of switches $S_4'$, $S_4$ in a given block the preceding block.

Compared with the coding system of FIG. 1, the coding system of FIG. 3 requires a greater amount of logic circuitry, but the parallel structure of the processor elements of the coders ensures reliable DPCM coding with coders switchable block by block.

As indicated at the predictor controller 3, the decision is based on the coded sample values $u_0$, $u_1$, $u_2$. For each of these values, the number of bits necessary for variable-length coding is accumulated over the duration of one block, and the decision is made on the basis of the sum reached at the end of the block, as described above. It is also possible to use other switching criteria and arbitrary block lengths, including blocks containing only a single sample value.

In the system described in the foregoing, switching is effected between two DPCM coders differing by their predictors (intraframe or interframe). The principle described can also be applied to switchovers between more than two types of DPCM coders. The number M of processor elements to be connected in parallel then will depend on the number N of different predictors, the number $N_I$ of predictors having a part in the prediction dependent on the preceding sample value, and the number K which indicates how many additional blocks have to be buffered because of the delayed decision. It is given by the general formula $$M = \left( (N - N_I) \cdot \sum_{j=0}^{K} N_I^j \right) + N_I^{K+1}$$

In the system of FIG. 3,

N=2, because two different predictors (intraframe and interframe) are present, $N_I$=1, because only one of the predictors (the intraframe predictor) has a part in the prediction on the preceding sample value, and K=1, since one block has to be buffered because of the delayed decision.

In conclusion, the following remarks should be made about the system according to the invention:

Since in the system of FIG. 3 the decision on the best suited coder does not load the time-critical loop but is made with a delay in a separate process which is independent of the operation of the loop, the system can be operated at a clock rate of up to 14.7 MHz, whereas the maximum clock rate for the system of FIG. 1 is only 7.2 MHz. These clock rates were calculated for 2 m CMOS circuits.

The processor element $PE_0$, like the other processor elements, is capable of processing two parts of the prediction value although only one prediction value, $h_3$, has to be processed. As shown in FIG. 2, this eliminates the need for only a small portion of the circuit, namely one subtracter and two delay elements, so that it is justified for manufacturing reasons to give preference to a uniform design of the processor elements.

The uniform processor elements do not require an excessive amount of circuitry, because they contain only simple elements such as adders, subtracters, delay elements providing a delay of only one clock period, and no large memories and logic circuits. The predictor loops with large memories, i.e., the picture memory 11 and the line memory 10, and the predictor controller 3 are present only once, so that the overall circuit complexity is justified in view of the extremely high processing speed.

The above-described coding systems are designed only for the sending end of a transmission system. As in the case of conventional adaptive DPCM coders, the receiver must be informed by some kind of additional information which type coder is on at the sending end.

The coding system according to the invention, both that of FIG. 1 and that of FIG. 3, can be used for coding both the luminance signal and the chrominance signal. At present, it appears to be necessary only for luminance-signal coding.

As indicated in the drawings by the numbers at the lines, all values are represented by 8 bits and processed in parallel except the coded values u, for which 4-bit coding is used in the example shown. The number of bits for u depends on the number of levels of the quantizer (Q, FIG. 2) in the processor element.

The present invention has been described above with regard to the certain presently contemplated specific embodiments of the invention. It will be appreciated by those skilled in the art that modifications and variations thereof are possible within the spirit and scope of the appended claims.

What is claimed is:

1. A circuit arrangement for adaptively coding a sequence of multi-element lines and multi-line frames of elemental digital video signal sample values, said circuit arrangement comprising:
   a first digital coding circuit implementing a two-dimensional intraframe predictor for generating both a coded and a corresponding decoded digital representation of an uncoded digital sample value, said first digital coding circuit further comprising
      a first predictor loop for calculating a first part of a first prediction value using a first decoded digital sample value which corresponds to the preceding uncoded sample value, and
      a second predictor loop for calculating a second part of said first prediction value using one or more decoded sample values corresponding to at least a portion of the preceding line of uncoded sample values,
   a second digital coding circuit implementing an interframe predictor and further comprising
      a third predictor loop for calculating a second prediction value using at least one decoded sample value corresponding to an element in the preceding frame of uncoded sample values,
   input means for inputting successive blocks of uncoded elemental digital sample values concurrently to both of said coding circuits,
   predictor controller means responsive to the blocks of coded sample values output from each of said coding circuits corresponding to a particular block of uncoded input elemental sample values for generating a control signal designating which one of the coding circuits is best suited for coding said particular block,
   first switch means responsive to said control signal and having an intraframe input associated with said first coding circuit and an interframe input associated with second coding circuit for selectively coupling the block of coded sample values output from the thus-designated coding circuit to an output of said circuit arrangement and for coupling the decoded sample values corresponding to each such particular block from the particular coding circuit thus-designated for that block to respective inputs of said second and third predictor loops for use in coding and decoding a subsequent block of uncoded signal values, and
   second switch means also responsive to said control signal for normally coupling the most recently decoded sample value from the first digital coding circuit into said first predictor loop, but during at least each of the first sample value periods immediately following certain designated blocks for which said second decoding circuit was the designated coding circuit, feeding the most recently decoded sample value from the second digital coding circuit into said first predictor loop.

2. A circuit arrangement as claimed in claim 1, wherein said certain designated blocks are only those blocks for which said second decoding circuit was the designated coding circuit.

3. A circuit arrangement as claimed in claim 1, wherein said predictor controller means
   first calculates separately for each said coding circuit the sum of the bits necessary for variable-length coding the sample values ($u_0$, $u_1$, $u_2$) output by said each coding circuit over the duration of a particular block and
   then designates as the best suited for that block the particular coding circuit having the smallest associated thus-calculated sum.

4. A circuit arrangement as claimed in claim 1, wherein each of said digital coding circuits contains a substantially identical processor element in the form of an otherwise conventional two-dimensional intraframe prediction digital coding circuit usable with one or more external prediction loops, each said processor element having at least three inputs respectively for the sample value to be coded and at least two possible parts of the prediction value to be used therefor and at least two outputs respectively for the coded sample value and a reconstructed sample value corresponding to saod coded sample value.

5. A circuit arrangement as claimed in claim 1 further comprising
   a plurality of buffers for respectively storing the coded sample values and the decoded sample values from each of said coding circuits,
   wherein
   said predictor controller means does not designate which coding circuit is best suited for coding a particular block prior to the processing by said coding circuits of at least some uncoded sample values of the block immediately following said particular block.

6. A circuit arrangement as claimed in claim 5, wherein said certain designated blocks are all blocks subsequent to a first block, said circuit arrangement further comprising
   a third digital coding circuit substantially identical to said first digital coding circuit,
      said third digital coding circuit also implementing a substantially identical two-dimensional intraframe predictor and also being coupled to said input means for receiving said successive blocks of uncoded elemental digital sample values concurrently with said first digital coding circuit,
      said third digital coding circuit using said second predictor loop for calculating a second part of a third prediction value for a given uncoded input sample value using the same said one or more decoded signal samples associated with a preceding line as is used by said first decoding circuit for calculating the corresponding part of said first prediction value,
      said third digital coding circuit further comprising a fourth predictor loop substantially identical to said first predictor loop for calculating a first part of a third prediction value using a second decoded sample value which also corresponds to said preceding uncoded sample value but which is not necessarily decoded by the same one of said digital coding circuits,
   third switch means also responsive to said control signal for normally coupling the most recently decoded sample value from the third digital coding circuit to said third predictor loop, but at least during the first sample value period of the second block immediately following a block for which said second decoding circuit was the designated coding circuit, coupling the most recently decoded sample value from the first digital coding circuit to said third predictor loop, and fourth switch means also responsive to said control signal for normally coupling the third digital coding circuit to the intraframe input of said first switch means, but, at during least any block in which said intraframe input of said first switch means is coupled to said output and said any block is the second block immediately following a block for which said second decoding circuit was the designated coding circuit, for selectively coupling the first decoding circuit thereto.

* * * * *

UNITED STATES PATENT AND TRADEMARK OFFICE
CERTIFICATE OF CORRECTION

PATENT NO. : 4,827,340
DATED : May 2, 1989
INVENTOR(S) : Peter Pirsch

It is certified that error appears in the above-identified patent and that said Letters Patent is hereby corrected as shown below:

On the Front Page:

Abstract, line 14, change second occurrence of "$S_4'$" to -- $S_4$ --.

In the Specification:

Column 1, line 35, change "them" to -- then --.
Column 1, line 63, change "feed" to -- fed --.

Column 2, line 23, after "later" insert a period.

Column 5, lines 13,14, change "selected" to -- selecting --.

Column 7, line 46, after "block" insert -- corresponds to the position of switches $S_1'$, $S_1$ during --.

In the Claims:

Column 10, line 19, change "saod" to -- said --.

Column 11, line 6, change "at during" to -- during at --.

Signed and Sealed this

Twenty-seventh Day of March, 1990

Attest:

JEFFREY M. SAMUELS

*Attesting Officer*   *Acting Commissioner of Patents and Trademarks*